US010897219B2

(12) United States Patent
Yamasaki

(10) Patent No.: US 10,897,219 B2
(45) Date of Patent: Jan. 19, 2021

(54) DRIVE APPARATUS AND ELECTRIC POWER STEERING APPARATUS USING THE SAME

(71) Applicant: DENSO CORPORATION, Kariya (JP)

(72) Inventor: Masashi Yamasaki, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/241,185

(22) Filed: Jan. 7, 2019

(65) Prior Publication Data
US 2019/0140574 A1 May 9, 2019

Related U.S. Application Data

(63) Continuation of application No. 15/480,188, filed on Apr. 5, 2017, now Pat. No. 10,211,771.

(30) Foreign Application Priority Data

Apr. 6, 2016 (JP) .................... 2016-076675

(51) Int. Cl.
H02P 27/06 (2006.01)
H02K 11/215 (2016.01)
H02K 11/33 (2016.01)
B62D 5/04 (2006.01)
H02P 25/22 (2006.01)
H02K 5/22 (2006.01)
(Continued)

(52) U.S. Cl.
CPC ............ H02P 27/06 (2013.01); B62D 5/04 (2013.01); B62D 5/0406 (2013.01); H02K 5/225 (2013.01);
(Continued)

(58) Field of Classification Search
CPC . H02P 27/06; H02P 6/16; H02P 25/22; H02K 11/215; H02K 11/33; H02K 5/225; H02K 9/22; B62D 5/04; B62D 5/0406
(Continued)

(56) References Cited

U.S. PATENT DOCUMENTS 4,542,329 A * 9/1985 Tu Xuan ................ G04C 3/143
310/49.24
6,172,438 B1 * 1/2001 Sakamoto ............... H02K 37/12
310/156.12
(Continued)

FOREIGN PATENT DOCUMENTS

JP 2015-116095 A 6/2015
WO WO 2017/175843 10/2017

Primary Examiner — Jorge L Carrasquillo
Assistant Examiner — Devon A Joseph
(74) Attorney, Agent, or Firm — Maschoff Brennan

(57) ABSTRACT

An electric power steering apparatus includes a motor, a controller including electrical components mounted on a substrate, and a connector unit including a cover that includes a first connector and a second connector, the first and second connectors connecting power and signals, in which each of the first connector and the second connector comprises a power supply part and a signal connection part, each of the power terminal and the signal terminal extend from the substrate in an axial direction of the motor, each of the power terminal and the signal terminal extend through the cover, each of the first connector and the second connector are arranged within a silhouette of the motor along the axial direction of the motor, each of the first connector and the second connector comprises an opening positioned on a side of the cover opposite the motor in the axial direction of the motor, the first connector and the second connector connect to and disconnect from the harness in a direction substantially parallel to the axial direction of the motor, and a portion of each of the power terminal and the signal terminal that extends from the cover toward the substrate in the axial direction has a substantially straight shape.

2 Claims, 10 Drawing Sheets

(51) Int. Cl.
   *H02K 9/22* (2006.01)
   *H02P 6/16* (2016.01)
(52) U.S. Cl.
   CPC ............ *H02K 9/22* (2013.01); *H02K 11/215* (2016.01); *H02K 11/33* (2016.01); *H02P 6/16* (2013.01); *H02P 25/22* (2013.01)
(58) Field of Classification Search
   USPC ........................................................ 318/504
   See application file for complete search history.

(56) References Cited

U.S. PATENT DOCUMENTS

| | | | | |
|---|---|---|---|---|
| 6,246,205 B1* | 6/2001 | Kujira | ................ | H02P 8/02 318/400.39 |
| 7,511,391 B2* | 3/2009 | Kawamoto | .............. | H02K 1/14 310/40 MM |
| 2002/0043883 A1* | 4/2002 | Shimizu | ............... | H01R 13/405 310/71 |
| 2003/0045151 A1* | 3/2003 | Josquin | ................ | F21S 41/192 439/280 |
| 2006/0202580 A1* | 9/2006 | Lee | ..................... | H02K 1/2786 310/156.45 |
| 2012/0256510 A1* | 10/2012 | Yamada | ................ | H02K 19/12 310/184 |
| 2013/0285591 A1 | 10/2013 | Suzuki | | |
| 2014/0028160 A1* | 1/2014 | Yamada | ................ | H02K 1/223 310/68 B |
| 2014/0376188 A1 | 12/2014 | Morino | | |
| 2016/0118923 A1 | 4/2016 | Kano | | |
| 2016/0355210 A1* | 12/2016 | Inada | ..................... | H02P 27/06 |
| 2017/0291635 A1 | 10/2017 | Yamasaki | | |
| 2017/0291640 A1 | 10/2017 | Fujita et al. | | |

\* cited by examiner

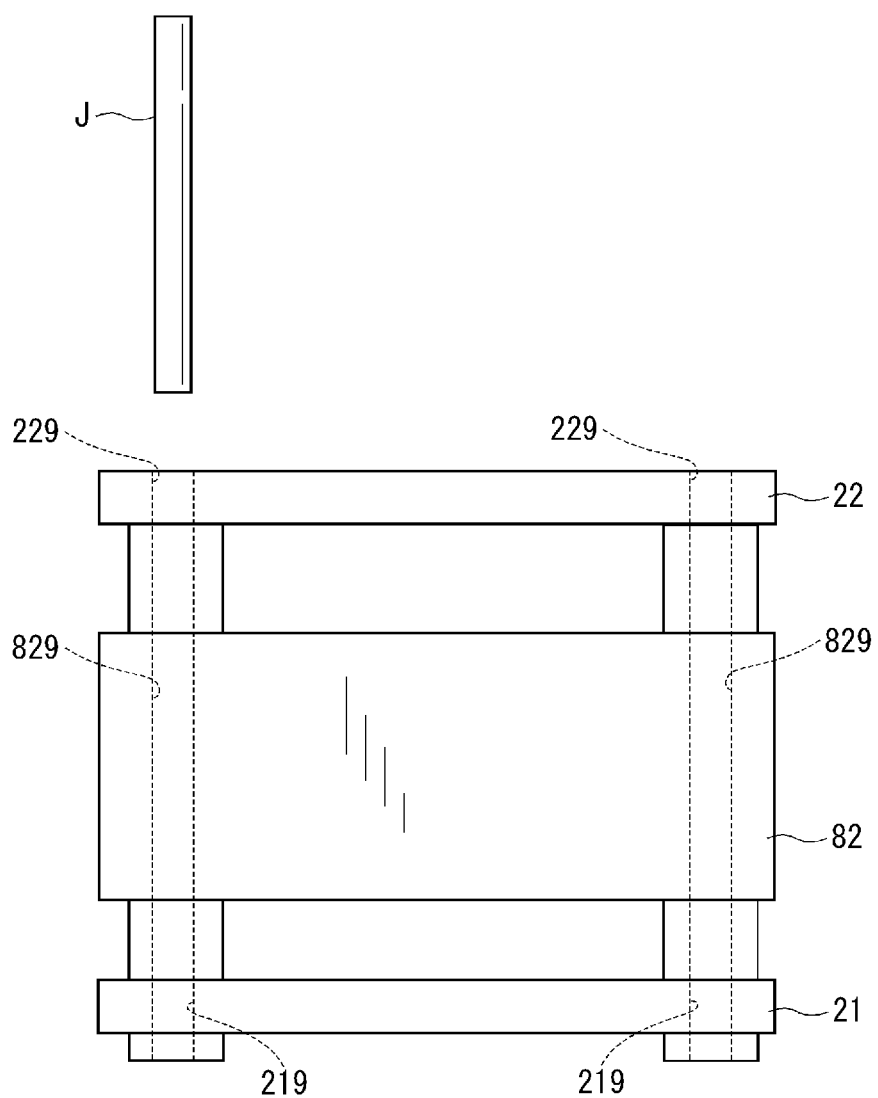

DRIVE APPARATUS AND ELECTRIC POWER STEERING APPARATUS USING THE SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Technical Field

The present disclosure relates to a drive apparatus and an electric power steering apparatus using the same.

Description of the Related Art

An electronic control unit used for an electric power steering apparatus has been known. For example, according to Japanese Patent Application Laid-Open Publication No. 2015-116095, two substrates are provided with power modules. The power modules are provided between substrates, and connected to an input/output substrate by leads disposed in an input/output side of the sealing package, and connected to a control substrate by leads disposed in the control substrate side.

According to the above-mentioned patent literature JP-A-2015-116095, terminals connected to the input/output substrate are folded from outside the substrate so as to connect with the substrate. Hence, a wiring space causes an increase in size and may require long wirings.

SUMMARY

The present disclosure has been achieved in light of the above-described circumstances, and provides a drive apparatus capable of reducing the wiring space, and an electric power steering apparatus using the same.

A drive apparatus according to the present disclosure is provided with a motor, a plurality of substrates and a plurality of connectors.

The motor includes a plurality of winding groups. The substrates are provided in one side of the motor relative to the axial direction thereof, the substrates including switching elements and control components mounted thereon, the switching element serving as a conduction control of the winding groups, and the control components being related to a driving control of the motor. The connectors are provided in an opposite side against the motor across the substrates, the connectors including connector terminals connected to one of the substrates.

Each of the substrate includes two or more non-overlapped regions where the substrate is not overlapped with other substrate when projecting the substrates in the axial direction. A connector connecting region is defined as at least one of regions in the non-overlapped regions, the connector connecting region being connected to the connector terminals. A motor line connecting region is defined as at least one of regions in the non-overlapped regions excluding the connector connecting region, the motor line connecting region being connected to the winding groups corresponding to every phase of each winding group.

According to the present disclosure, the connector terminals, the motor lines and substrates are connected in the non-overlapped region. Thus, since the connector terminals and the motor lines extend substantially straight to connect to the substrates, a wiring space can be minimized.

BRIEF DESCRIPTION OF DRAWINGS

In the accompanying drawings:

FIG. 10 is a schematic side view showing a positional alignment of the substrate according to the fourth embodiment of the present disclosure.

DETAILED DESCRIPTION OF THE PREFERRED EMBODIMENTS

With reference to the drawings, hereinafter, a drive apparatus according to the present disclosure and an electric power steering apparatus using the drive apparatus will be described. Hereinafter, in a plurality of embodiments, the same reference signs are applied to substantially the same configuration and the explanation thereof will be omitted.

First Embodiment

With reference to FIGS. 1 to 6, the first embodiment of the present disclosure will be described.

Figure 1:
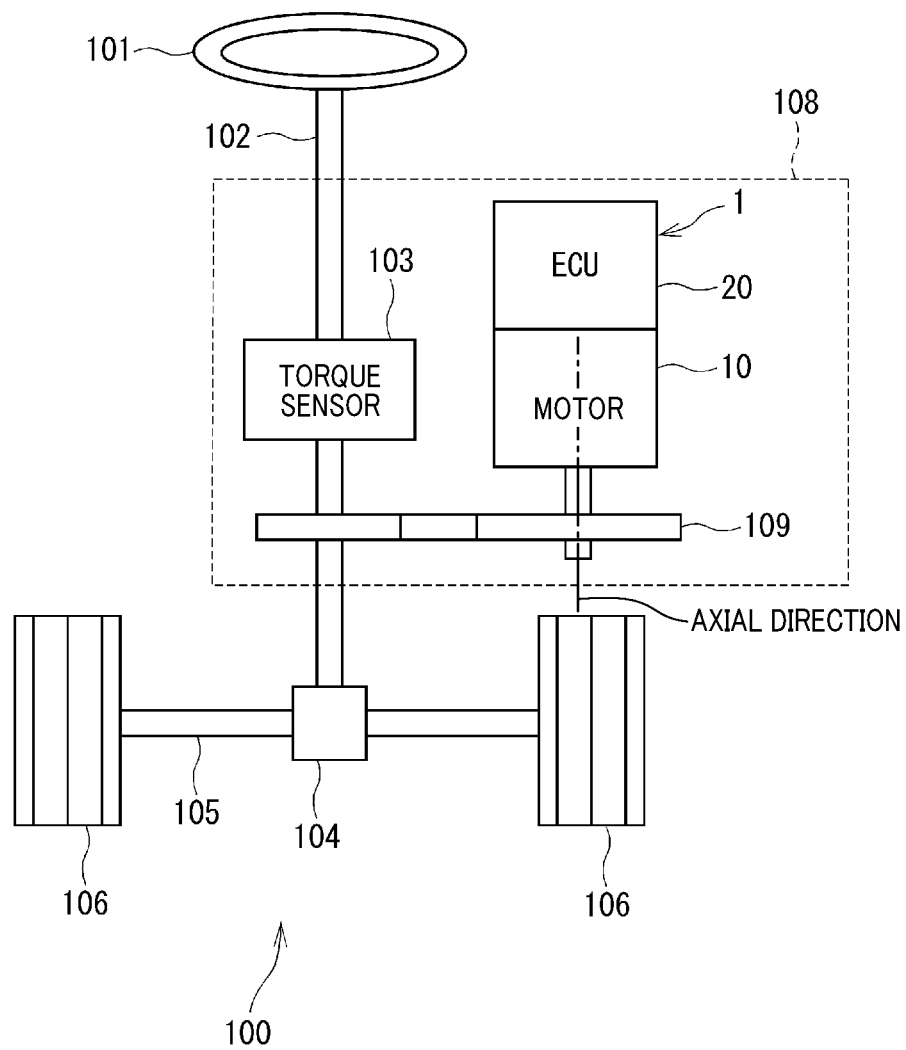
FIG. 1 is a diagram showing an overall configuration of a steering system according to a first embodiment of the present disclosure.

As shown in FIG. 1, the drive apparatus 1 is applied to an electric power steering apparatus 108 that assists a steering operation by the driver. A motor 10 as a rotary electric machine and a controller 20 that performs a driving control of the motor 10 are integrated to configure the drive apparatus 1. In FIG. 1, the controller 20 is indicated as "ECU".

FIG. 1 illustrates an overall configuration of a steering system 100 provided with an electric power steering apparatus 108. The steering system 100 is configured of a steering wheel 101 as a steering member, a column shaft 102, a pinion gear 104, a rack shaft 105, a wheel 106, and an electric power steering apparatus 108 or the like.

The steering wheel 101 is connected to the column shaft 102. The column shaft 102 is provided with a torque sensor 103 that detects a steering torque. A pinion gear 104 is provided at the tip end of the column shaft 102, and engages the rack shaft 105.

A pair of wheels 106 are provided at both ends of the rack shaft 105 via a tie rod or the like.

When the driver rotates the steering wheel 101, the column shaft 102 connected to the steering wheel 101 rotates. A rotary motion of the column shaft 102 is converted into a linear motion of the rack shaft 105 by the pinion gear 104, whereby the pair of wheel 106 is steered with an angle in response to the variation of the rack shaft 105.

The electric power steering apparatus 108 is provided with a reduction gear 109 as a power transmission member and a drive apparatus 1. The electric power steering apparatus 108 outputs, from the motor 10, an auxiliary torque that assists steering of the steering wheel 101 to be transmitted to the column shaft 102 via the reduction gear 109, based on a steering torque acquired by the torque sensor 103 and a running speed signal acquired via CAN (controller area network) which is not shown. Specifically, the electric power steering apparatus 108 according to the present embodiment assists rotation of the column shaft 102 with a torque generated by the motor 10, that is, so called "column assist". However, so called "rack assist" that assists the rack shaft 105 may be used. In other word, according to the present embodiment, the column shaft 102 is defined as a "drive object", but the rack shaft 105 may be defined as the "drive object".

Figure 2:
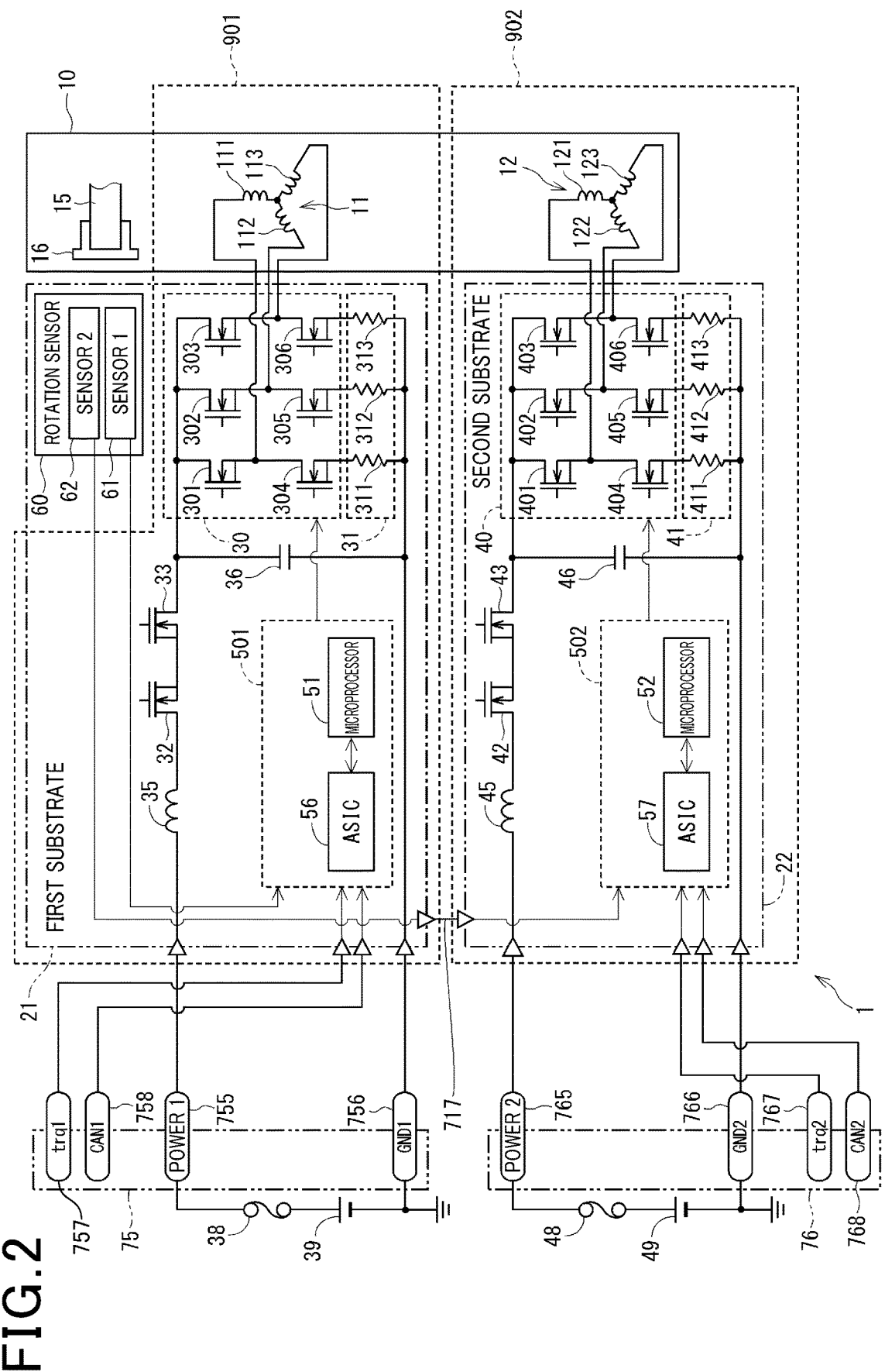
FIG. 2 is a circuit diagram showing a drive apparatus according to the first embodiment of the present disclosure.

Next, with reference to FIG. 2, electrical configuration of the electric power steering apparatus 108 will be described. In FIG. 2, wirings on the substrates 21 and 22 are shown with a thin line and a part of wirings are omitted to eliminate complications. The motor 10 is configured of a three-phase brushless motor, including 2 winding groups that is, windings 11 (first winding 11) and windings 22 (second winding 12) which wound around the stator (not shown). Each of the windings 11 and windings 12 is configured as three-phase windings. The first winding 11 includes an U1 coil 111, a V1 coil 112, and a W1 coil 113. The second winding 12 includes a U2 coil 121, a V2 coil 122 and a W2 coil 123. The current flowing thorough each phase of the first winding is defined as a phase current Iu1, Iv1 and Iw1, and the current flowing through each phase of the second winding is defined as Iu2, Iv2 and Iw2. The motor 10 has a rotating axis and rotates around the rotating axis. The direction where the rotating axis extends is defined as an axial direction.

The first winding 11 is supplied with power from a first battery 39 via a first inverter 30 connected to the first winding 11.

The first inverter 30 includes 6 switching elements 301 to 306 connected to form a bridge circuit, thereby converting the power of the first winding 11. Hereinafter, "switching element" is abbreviated as "SW element". The SW elements 301 to 306 are configured of MOSFETs (metal oxide semiconductor field effect transistor), but may be configured of IGBTs or thyristors. The SW elements 401 to 406 and the relay 32, 33, 42, 43 or the like which will be described later are the same as the above.

The SW elements 301 to 303 are arranged in a high-potential side and the SW elements 304 to 306 are arranged in a low-potential side. One end of an U1 coil 111 is connected to a connection point between the U-phase SW elements 301 and 304. One end of a V1 coil 112 is connected to a connection point between the V-phase SW elements 302 and 305. One end of a W1 coil 113 is connected to a connection point between the W-phase SW elements 303 and 306.

A first current sensor 31 is provided in the low potential side of the SW elements 304 to 306, to detect phase current Iu1, Iv1 and Iw1. The first current sensor 31 includes current detectors 311 to 313 provided to respective phases. The current detectors 311 to 313 according to the present embodiment are shunt resistors. However, Hall elements or the like can be used therefor. The current detectors 411 to 413 are the same as the current detectors 311 to 313.

The first power relay 32 is provided between the first battery 39 and the first inverter 30 and controls the current between the first battery 39 and the first inverter 30 to be conduction or cutoff. A first reverse-connection protection relay 33 is provided between the first power relay 32 and the first inverter 30. The first reverse-connection protection relay 33 is connected such that the direction of the parasitic diode is opposite to the first power relay 32. Thus, reverse current can be prevented from flowing in the case where the first battery 39 is connected in reverse.

The first choke coil 35 is provided in the first battery 39 side of the first power relay 32.

The first capacitor 36 is connected in parallel to the first inverter 30. The choke coil 35 and the capacitor 36 configures a filter circuit to reduce noise propagated from other devices which share the battery 39, and also reduce noise propagating from the drive apparatus 1 to other devices which share the battery 39. The capacitor 36 stores electrical charge to assist supplying power to the first inverter 30.

A second inverter 40 is connected to the second winding 12 to which power is supplied from the second battery 49 via the second inverter 40.

The second inverter 40 converts the power of the second winding 12, where 6 SW elements are connected as a bridge connection. The SW elements 401 to 403 are arranged in the high potential side and the SW elements 404 to 406 are arranged in the low potential side. One end of the U2 coil 121 is connected to a connection point between the U-phase SW elements 401 and 404. One end of the V2 coil 122 is connected to a connection point between the V-phase SW elements 402 and 405. One end of the W2 coil 123 is connected to a connection point between the W-phase SW elements 403 and 406.

In the low potential side of the SW elements 404 to 406, a second current sensor 41 is provided. The second current sensor 41 includes current detectors 411 to 413.

A second choke coil 45, a second power relay 42, and second reverse-connection protection relay 43 are disposed in this order from the second battery 49 side, between the second battery 49 and the second inverter 40.

Since the second power relay 42, the second reverse-connection protection relay 43, the second choke coil 45 and the second capacitor 46 are similar to the first power relay 32, the first reverse-connection protection relay 33, the first choke coil 35 and the first capacitor 36, explanation thereof will be omitted. Assuming the power relays 32 and 42 are mechanical relays, the reverse-connection relays 33 and 43 can be omitted.

A first control unit 501 controls conduction of the first winding 11, including a first microprocessor 51 and a first integrated circuit 56. It should be noted that the integrated circuit is denoted as ASIC (application specific circuit) in the drawings.

The first microprocessor 51 generates a control signal that controls ON/OFF operation of the SW elements 301 to 306 of the first inverter 30, the relay 32 and the relay 33, based on detection values of the first current sensor 31, a rotation sensor 60 and the torque sensor 103 (see FIG. 1).

The first integrated circuit 56 includes a pre-driver, a signal amplifier and a regulator.

The pre-driver generates a gate signal in accordance with a control signal. The generated gate signal is outputted to gates of the SW elements 301 to 306. Thus, the SW elements 301 to 306 are ON-OFF controlled. The signal amplifier amplifies the detection signals of the first current sensor 31 or the like and outputs the amplified detection signals to the first microprocessor 51. The regulator stabilizes the voltage supplied to the first microprocessor 51 or the like.

A first control unit 502 controls conduction of the second winding 12, including a second microprocessor 52 and a second integrated circuit 57.

The second microprocessor 52 generates a control signal that controls ON/OFF operation of the SW elements 401 to 406 of the second inverter 40, the relay 42 and the relay 43, based on detection values of the second current sensor 41, the rotation sensor 60 and the torque sensor 103 (see FIG. 1).

The second integrated circuit 57 includes a pre-driver, a signal amplifier and a regulator.

The pre-driver generates a gate signal in accordance with a control signal. The generated gate signal is outputted to gates of the SW elements 401 to 406. Thus, the SW elements 401 to 406 are ON-OFF controlled. The signal amplifier amplifies the detection signals of the second current sensor 41 or the like and outputs the amplified detection signals to the second microprocessor 52. The regulator stabilizes the voltage supplied to the second microprocessor 52 or the like.

The rotation sensor 60 includes a first sensor 61 and a second sensor 62. In the drawings, the first sensor 61 is described as "sensor 1" and the second sensor 62 is described as "sensor 2".

Each of the sensors 61 and 62 is configured as an IC including a sensor element that detects a magnetic flux changing in response to a rotation of a magnet 16 (described later), an A/D converter that converts a detection signal of the sensor element into digital data, and a calculator that performs various calculations based on the A/D converted detection value.

In accordance with the detection value, the calculator has a function of calculating a rotational angle of the motor 10 and a function of calculating a rotational frequency of the motor 10, based on detected value, and outputs information about the rotational angle and information about the rotation frequency to the microprocessors 51 and 52. According to the present embodiment, the output signal depending on the detection signal of the first sensor 61 is outputted to the first microprocessor 51 and the output signal depending on the detection signal of the second sensor 62 is outputted to the microprocessor 52. Even when the system is stopped, the rotational frequency of the motor 10 is counted so that a rotational angle of the steering wheel 101 as a steering angle can be appropriately calculated in accordance with the rotational angle and the rotation frequency of the motor 10. As a result, a steering sensor detecting the steering angle can be omitted.

In the following description, the first winding 11, and the first inverter 30 and the first control unit 501 or the like provided corresponding to the first wirings 11 are denoted as a first system 901. The second windings 12, and the second inverter 40 and the second control unit 502 or the like provided corresponding to the second windings 12 are denoted as a second system 902. In the drawings, to avoid complication, the rotation sensor 60 is not included in the systems 901 and 902. However, the first sensor 61 may be included in the first system 901 and the second sensor 62 may be included in the second system 902. Also, in the drawings, the first system 901 is denoted as "system 1" and the second system 902 is denoted as "system 2".

According to the present embodiment, circuit components such as the first inverter 30 and the first control unit 501 are provided corresponding to the first winding 11, and circuit components such as the second inverter 40 and the second control unit 502 are provided corresponding to the second windings 12. Hence, even when an abnormality occurs in a part of the circuit components such as the inverters 30 and 40, and an abnormality occurs in either the first control unit 501 and the second control unit 502, the motor 10 can be driven continuously. In other words, in the drive apparatus 1 according to the present embodiment, in addition to the inverters 30 and 40, the circuit configuration including the control units 501 and 502 is configured as a redundant configuration.

According to the present embodiment, the first battery 39 and the second battery 49 are provided, and also batteries are configured as a redundancy configuration. Different voltages may be used for the batteries 39 and 49. When the voltages of the battery 39 and 49 are different, for example, a voltage converter or the like may be disposed at least between the first battery 39 and the first inverter 30, or between the second battery 49 and the second inverter 40.

In the positive electrode sides of the batteries 39 and 49, fuses 38 and 48 are provided.

A white triangle in the circuit diagram denotes a connection point between each terminal and the substrates 21 and 22.

According to the present embodiment, the terminals 755 to 758 provided at the first connector 75 are connected to the first substrate 21, and the terminals 765 to 768 provided at the second connector 76 are connected to the substrate 22. Also, the internal signal terminal 717 is connected to the first substrate 21 and the second substrate 22. The detailed terminal connection will be described later.

In FIG. 2, the power terminal is denoted as "power 1", "power 2", the ground terminal is denoted as "GND1" and "GND2", the torque signal terminal is denoted as "trq1" and "trq2", and the vehicle signal terminal is denoted as "CAN 1", "CAN 2".

Figure 3:
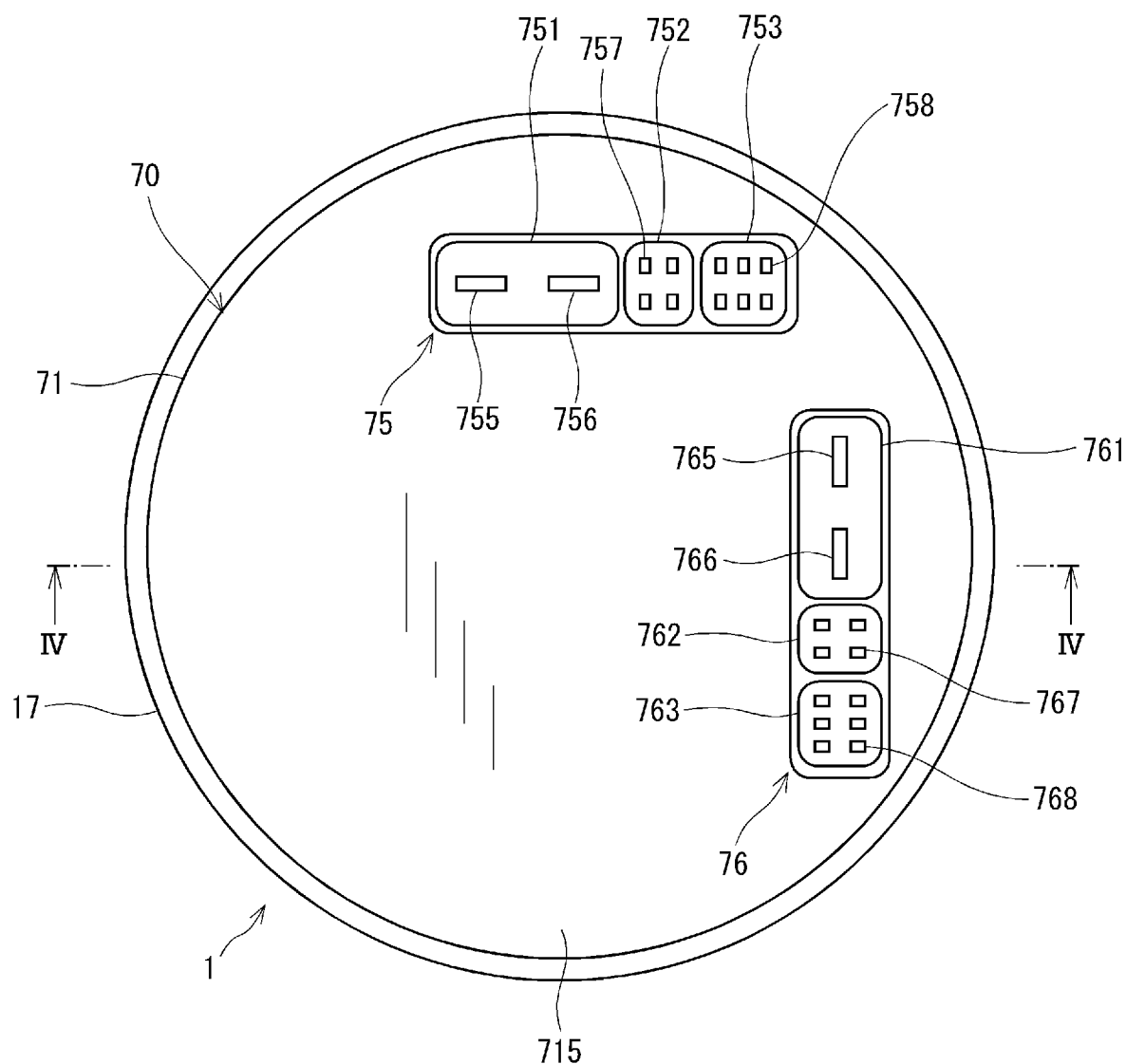
FIG. 3 is a plan view of the drive apparatus according to the first embodiment of the present disclosure.
Figure 4:
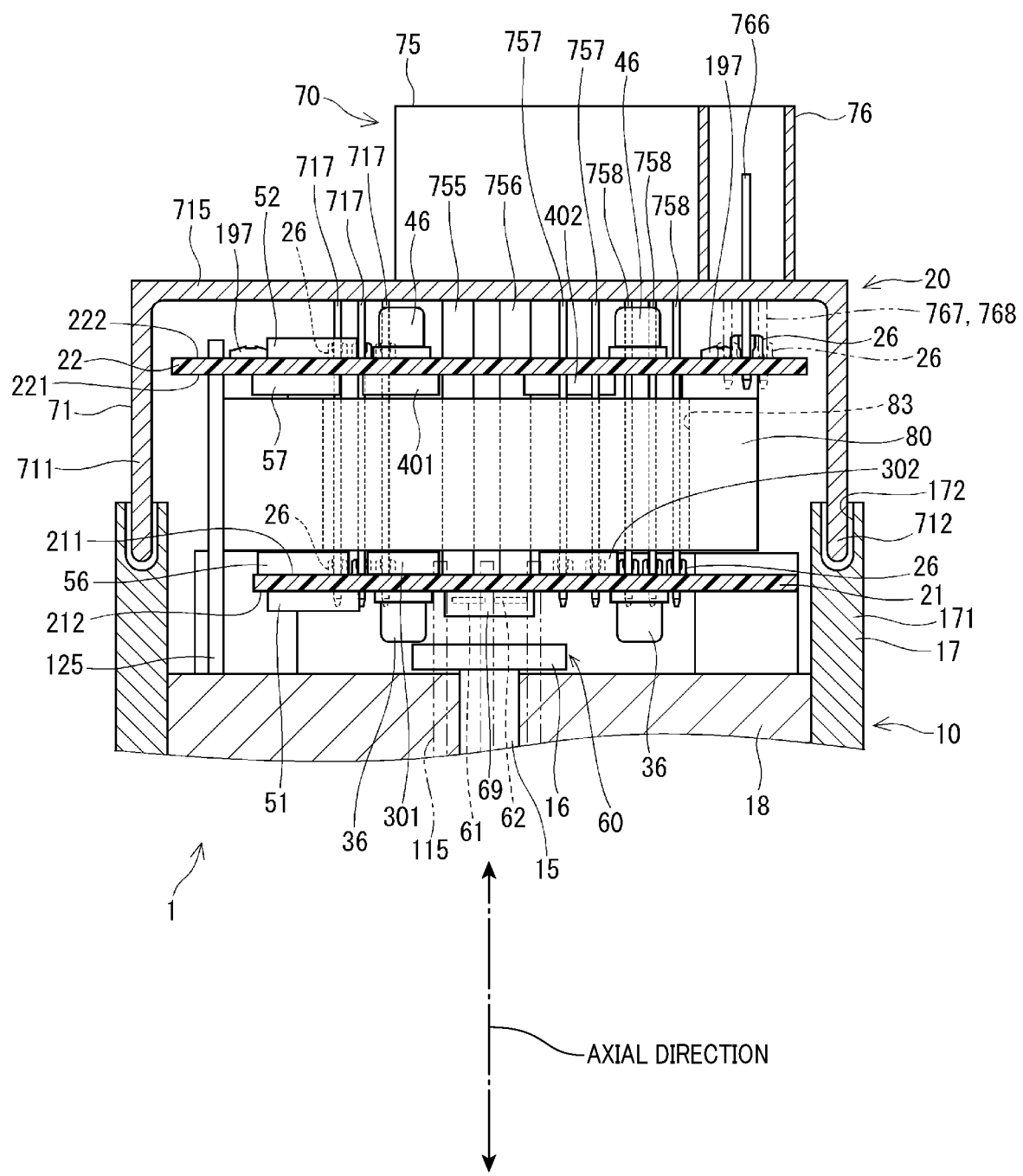
FIG. 4 is a cross-sectional view of FIG. 3, taken along IV-IV line.

The structure of the drive apparatus is shown in FIGS. 3 and 4. FIG. 4 is a cross-sectional view taken along the line IV-IV in FIG. 3, in which a part of the configuration in a front side than the cut section (i.e., lower part of the paper sheet surface of FIG. 3) is shown with a two-dotted line).

As shown in FIG. 4, the motor 10 is provided with a stator, a rotor, and a shaft 15 or the like. The windings 11 and 12 are wound around the stator and fixed inside the motor case 17. The rotor is provided rotatably relative to the stator. The shaft 15 is fixed to the center axis of the rotor. Thus, the shaft 15 and the rotator integrally rotate.

At an opposite end portion of the shaft 15 relative to the controller 20, a reduction gear 109 (see FIG. 1) and an output terminal which is not shown are provided. Thus, the torque generated by a rotation of the rotor and the shaft 15 is transmitted to the column shaft 102 via the reduction gear 109. In the specification, it should be noted that rotation of the rotor and the shaft 15 is simply referred to as "motor 10 rotates"

A magnet 16 rotating integrally with the shaft 15 is provided at an end portion in the controller 20 side of the shaft 15.

The motor case 17 includes a cylindrical member 171 formed in a substantial cylindrical shape. The stator, the rotor and the shaft 15 are accommodated inside the radial direction of the motor case 17.

A frame 18 is provided in a controller 20 side of the stator and the rotor, and fixed inside the radial direction of the motor case 17, by press fitting or the like. According to the present embodiment, the motor case 17 and the frame 18 forms an outline of the motor 10. The shaft 15 is inserted into the frame 18, and the magnet 16 is exposed to the controller 20 side.

The coils 111 to 113 corresponding to respective phases of the first winding 11 are connected to the motor lines 115. The motor lines 115 are inserted into a motor line insertion hole (not shown) formed in the frame 18, and withdrawn to be connected to the first substrate 21.

The coils 121 to 123 corresponding to respective phases of the second winding 12 are connected to the motor lines 125. (not shown) formed in the frame 18, and withdrawn to be connected to the second substrate 22.

The controller 20 is provided at one side of the motor 10 in the axial direction thereof. The controller 20 is provided as being accommodated in a motor silhouette which is a projection region where the motor case 17 is projected in the axial direction. Hereinafter, the axial direction and the radial direction of the motor 10 are simply referred to as "axial direction" and "radial direction" as an axial direction and a radial direction of the drive apparatus 1.

The controller 20 includes the substrates 21 and 22 on which various electronic components are mounted, and a connector unit 70.

The first substrate 21 and second substrate 22 are provided in one side of the motor 10 in the axial direction thereof and within a motor silhouette. A heat sink 80 is provided between the first substrate 21 and the second substrate 22. The heat sink 80 is made of a material such as aluminum or the like having a good thermal conductivity. The first substrate 21 is fixed to a motor 10 side of the heat sink 80 by a screw (not shown).

The second substrate 22 is fixed to an opposite portion to the motor 10 side of the heat sink 80 by a screw. In other words, the substrates 21 and 22 are fixed to both sides of the heat sink 80. The heat sink 80 is fixed to the frame 18 by a heat sink fixing screw (not shown) while the substrates 21 and 22 are fixed. In other words, the substrates 21 and 22 are stuck perpendicularly relative to an imaginary line which is an extended axis line of the motor 10. The term "perpendicularly" is not necessarily strictly perpendicular, but tolerates a small assembling error.

According to the present embodiment, a surface in the heat sink 80 side of the first substrate 21 is referred to as a first surface 211, a surface in an opposite side of the heat sink 80, that is, a surface in the motor 10 side is referred to as the second surface 212. Similarly, a surface in the heat sink side of the second substrate 22 is referred to as the first surface 221 and a surface in an opposite side of the heat sink 80 of the second substrate 22 is referred to as the second surface 222. The SW elements 301 to 306, the current detectors 311 to 313 (not shown in FIG. 4) and the first integrated circuit 56 or the like are mounted on the first surface 211 of the first substrate 21. The SW elements 401 to 406, the current detectors 411 to 413 (not shown in FIG. 4) and the second integrated circuit 57 or the like are mounted on the first surface 211 of the second substrate 22. In FIG. 4, only the SW elements 301, 302, 401 and 402 are shown among the SW elements 301 to 306 and 401 to 406.

The SW elements 301 to 306 and 401 to 406 are provided being capable of radiating heat from the heat sink 80. It should be noted that "provided as being capable of radiating heat" is not limited to the case where the SW elements 301 to 306, and 401 to 406 directly contact with the heat sink 80, but includes the case where the SW elements indirectly contact with the frame 18 via a heat-dissipation member such as heat dissipation gel, for example.

According to the present embodiment, the SW elements 301 to 306 and 401 to 406 are defined as "heat-generating elements". In addition to the SW elements 301 to 306 and 401 to 406, electric components other than the SW elements such as the integrated circuits 56 and 57, and current detectors 311 to 313 and 411 to 413 may be regarded as heat-generation elements, and may be provided to the heat sink 80, as being capable of radiating heat.

The first choke coil 35 (not shown in FIG. 4), the first capacitor 36, the first microprocessor 51 and the rotation sensor 60 or the like are mounted on the second surface 212 of the first substrate 21. The rotation sensor 60 is mounted to a portion facing the magnet 16. According to the present embodiment, each of the first sensor 61 and the second sensor 62 is formed of IC (integrated circuit) chip, and these two chips are accommodated in a single package 69. The rotation sensor 60 is mounted such that distances of respective magnetic sensors included in the sensors 61 and 62 relative to the center of the magnet 16 are the same. For the magnetic sensors, Hall elements or MR elements are used.

The second choke coil 45 (not shown in FIG. 4), the second capacitor 46 and the second microprocessor 52 are mounted on the second surface of the second substrates 22.

Figure 5:
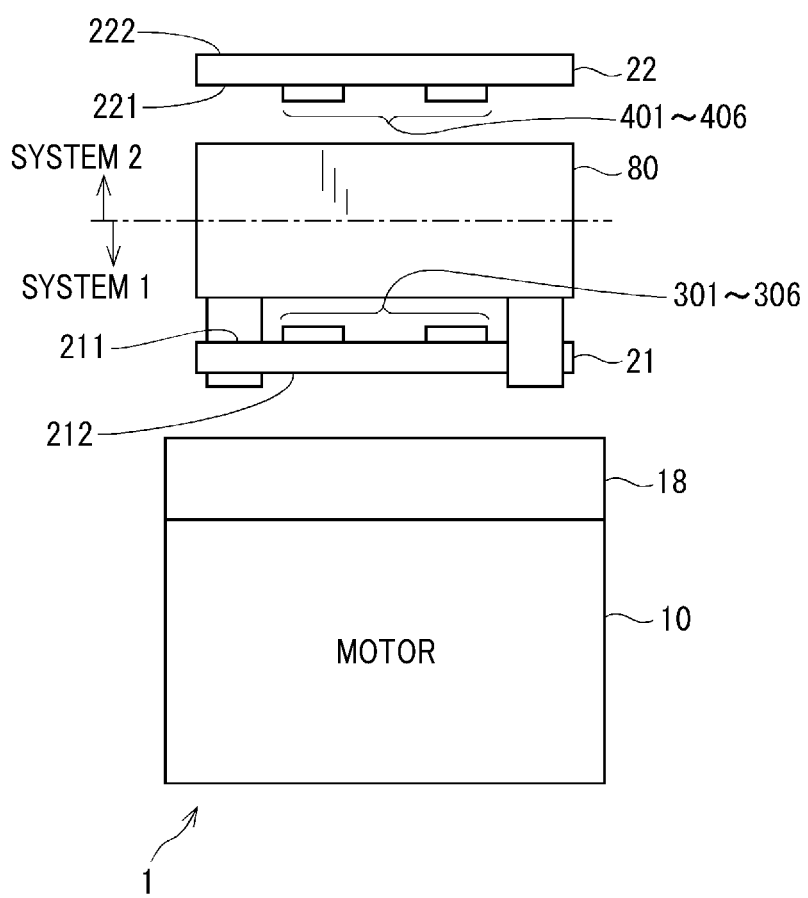
FIG. 5 is a schematic side view illustrating an arrangement of systems of the drive apparatus according to the first embodiment of the present disclosure.

As shown in FIGS. 4 and 5, according to the drive apparatus 1, electronic components related to the first system 901 are mounted on the first substrate 21, and electronic components related to the second system 902 are mounted on the second substrate 22. Specifically, according to the present embodiment, in the substrates 21 and 22, the power section and the control section are not isolated, in which power input/output line related to power supply of the battery and signal lines used for transmitting control signals are mixed.

According to the present embodiment, the substrates 21 and 22 are provided at both sides of the heat sink 80 in the axial direction, and heat produced at the SW elements 301 to 306 and 401 to 406 are radiated to the heat sink 80. Hence, in the first system 901 and the second system 902, each system is unlikely to be influenced by the other system. Also, heat produced by the SW elements 301 to 306 and 401 to 406 are radiated to the heat sink so that any difference in amount of heat radiation between the systems can be small. Further, circuit configurations for two systems including the heat-radiation structure can be separated from the motor 10. Hence, various tests can be performed for the circuit configurations as being separated from the motor 10.

In FIG. 5 which is a schematic side view, control components and connector units are omitted. Similarly, in FIG. 7, these components and units are omitted.

As shown in FIGS. 3 and 4, the connector unit 70 includes a cover 71, a first connector 75 and a second connector 76. The cover 71 is formed in a substantial bottomed cylindrical shape, including a cylindrical member 711 and a connector forming portion 715. A tip portion of the cylindrical member 712 is inserted into a groove portion 172 formed in the cylindrical member 171 of the motor case 17 and fixed thereto by an adhesive or the like.

The internal signal terminal 717 is formed in the motor 10 side of the connector forming portion 715. The internal signal terminal 717 is connected to the first substrate 21 and the second substrate 22 and used for transmitting a signal between the first substrate 21 and the second substrate 22. The internal signal terminal 717 is provided being separated from the terminals 755 to 758, and 765 to 768 and disconnected from outside the drive apparatus 1 such as the batteries 39 and 49, the torque sensor 103 and the CAN. According to the present embodiment, the internal signal terminal 717 is used for transmitting the detection value of the rotation sensor 60 to the second substrate 22 side. In more detail, the internal signal terminal 717 transmits the detection value of the second sensor 62 of the rotation sensor 60 to the second substrate 22.

The connectors 75 and 76 are provided at a portion opposite to the motor 10 in the connector forming portion 715. The connectors 75 and 76 are disposed within the motor silhouette. The connectors 75 and 76 according to the present embodiment are opened towards opposite side of the motor 10, to which the harnesses or the like are inserted into the axial direction.

As shown in FIGS. 2 to 4, the first connector 75 includes a power supply portion 751, a sensor connecting portion 752 and a CAN connecting portion 753. The second connector 76 includes a power supply portion 761, a sensor connecting portion 762 and a CAN connecting portion 763.

The power supply portion 751 provides connections to the first battery 39 and the ground. The power supply portion 761 provides connections to the second battery 49 and the ground. The sensor connecting portions 752 and 762 are used for connecting the torque sensor 103, and the CAN connecting portions 753 and 763 are used for connecting to the CAN.

A plurality of connectors are provided corresponding to the batteries 39 and 49, the torque sensor 103 and the CAN. Accordingly, even in the case where a part of wirings is accidentally detached or broken, the process can continue to operate at least either using the microprocessor 51 or the microprocessor 52.

The power supply portion 751 of the first connector 75 is provided with a power terminal 755 and a ground terminal 756. The sensor connecting portion 752 is provided with a torque signal terminal 757. The CAN connecting portion 753 is provided with a vehicle signal terminal 758. The terminals 755 to 758 of the first connector 75 are connected to the first substrate 21.

The power supply portion 761 of the second connector 76 includes a power terminal 765 and a ground terminal 766. The sensor connecting portion 762 includes a torque signal terminal 767. The CAN connecting portion 763 includes a vehicle signal terminal 768. The terminals 765 to 768 of the second connector 76 are connected to the second substrate 22. According to the present embodiment, the terminals 755 to 758 and 765 to 768 correspond to "connector terminals".

Figure 6:
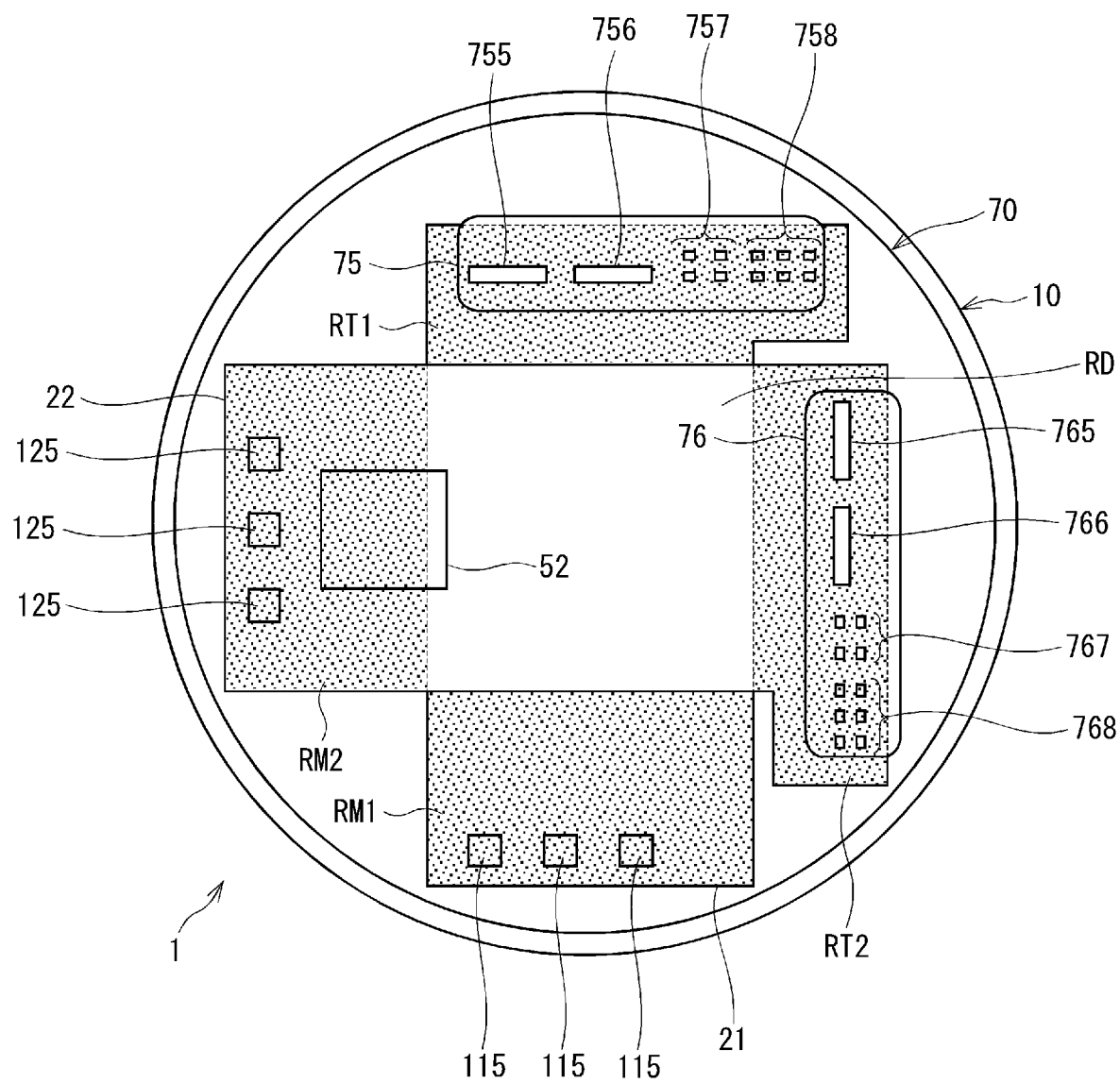
FIG. 6 is an explanatory diagram showing an arrangement of substrate according to the first embodiment of the present disclosure.

With reference to FIG. 6, connection between the terminals 755 to 758 and 765 to 768, the motor lines 115, 125, and the substrates 21 and 22 will be described. FIG. 6 is a schematic plan view when viewed from the connector 75 and 76 side, in which non-overlapped region is illustrated in dotted-shadow pattern.

As described above, the motor line 115 connected to the first winding 11 and the terminals 755 to 758 of the first connector 75 are connected to the first substrate 21. The motor line 125 connected to the second winding 12 and the terminals 765 to 768 of the second connector 76 are connected to the second substrate 22.

According to the present embodiment, considering a connection between the second substrate 21 and the motor line 125, where the second substrate is located in deeper side of the first substrate 21 when viewed from the motor 10 side, and a connection between the first substrate 21 and the terminals 755 to 758 of the first substrate 21 and the terminals 755 to 758, where the first substrate is located in deeper side of the second substrate 22 when viewed from the connectors 75 and 76, non-overlapped region is provided in which the first substrate 21 and the second substrate are not overlapped when viewed from the axial direction. According to the present embodiment, the substrates 21 and 22 are formed in the same shape and are rotated by 90 degrees, whereby non-overlapped regions RM1, RT1, RM2 and RT2 are provided, where substrates are not overlapped. The term "the same shape" includes a case where substrates are disposed the other way round. Also, the term "the same shape" includes a case where small differences between the substrates exist e.g., whether or not a notch portion exists.

The substrates 21 and 22 have two non-overlapped regions.

The non-overlapped portion RM1 of the first substrate 21 is defined as a motor line connecting region connected to the motor 115, and the non-overlapped region RT1 is defined as a connector connecting region connected to the terminals 755 to 758 of the first connector 75. The region RM1 and the region RT1 are isolated by the overlapped region RD.

Also, the non-overlapped region RM2 of the second substrate 22 is defined as a motor line connecting region connected to the motor lines 125, and the non-overlapped region RT2 is defined as a connector connecting region connected to the terminals 765 to 768 of the second connector 76. The region RM2 and the region RT2 are isolated by the overlapped region RD.

As shown in FIGS. 4 and 6, according to the present embodiment, the non-overlapped RM2 is provided so that the motor lines 125 extend substantially straight towards the second substrate 22 side without interfering with the first substrate 21, whereby the motor lines 125 and the second substrate 22 are connected. Similarly, the non-overlapped RT1 is provided so that the terminals 755 to 758 extend substantially straight towards the first substrate 21 side without interfering with the second substrate 22, whereby the terminals 755 to 758 and the first substrate 21 are connected. Thus, an increase of the wiring space can be minimized and the wirings can be shortened.

As shown in FIG. 4, the motor lines 115 and the first substrate 21, and the motor lines 125 and the second substrate 22 are electrically connected by a soldering or the like. The spring terminals 26 are provided at the connecting portions between the substrates 21 and 22, and the terminals 755 to 758 and 765 to 768. The spring terminals 26 are formed to have as size depending on the size of the terminals to be inserted thereto. The spring terminals are made of conductive material such as copper. In the first substrate 21, the spring terminals 26 are provided on the first surface 211 facing the connectors 75 and 76 side. In the second substrate 22, the spring terminals 26 are provided on the second surface 222 facing the connectors 75 and 7 side. The terminals 755 to 758 and 765 to 768 are inserted into the spring terminals 26, whereby the spring terminals 26 are elastically-deformed so as to come into contact with the terminals 755 to 758 and the 765 to 768. The end portions in the substrates 21 and 22 side of the spring terminals 26 are electrically connected to wiring patterns corresponding to respective terminals to be inserted thereto.

Thus, the terminals 755 to 758 are inserted through the spring terminals 26 provided on the first substrate 21, whereby the terminals 755 to 758 and the first substrate 21 are electrically connected. Further, the terminals 765 to 768 are inserted through the spring terminals 26 provided on the second substrate 22, whereby the terminals 765 to 768 and the second substrate 22 are electrically connected.

The internal signal terminal 717 penetrates the substrates 21 and 22 in the overlapped region where the first substrate 21 and the second substrate 22 are overlapped when viewed from the axial direction. It should be noted that the internal signal terminal 717 does not necessarily penetrate through the first substrate 21 which is located apart from the connector forming portion 715. In the substrates 21 and 22, the spring terminals 26 are provided at portions to which the internal signal terminal 717 inserted. The internal signal terminal 717 is inserted into the spring terminals 26. The internal signal terminal 717 is inserted into each of the spring terminals 26 of the substrates 21 and 22, whereby the internal signal terminal 717 and the first and second substrates 21 and 22 are electrically connected. The terminals 755 to 758 and 765 to 768 and 717, and the substrates 21 and 22 are connected by the spring terminals 26 so that a soldering process or the like in order to connect each terminal with the substrates 21 and 22 can be omitted.

The drive apparatus 1 according to the present embodiment is provided in the electric power steering apparatus 108. Since the electric power steering apparatus 108 has a function of turning the vehicle which is one of fundamental vehicle's functions, a redundant configuration is employed so as to maintain a steering assist even if an abnormality occurs on either one drive apparatus. On the other hand, to expand space of the vehicle cabin and improve fuel efficiency, the size of the drive apparatus 1 is required to be small.

In this respect, according to the present embodiment, to provide a redundant circuit configuration, the non-overlapped regions RM1, RT1, RM2 and RT2 are provided in the configuration having a plurality of substrates 21 and 22 so as to increase the wiring space. In the non-overlapped regions, the motor lines 115 and 125 or the terminals 755 to 758 and 765 to 768 are connected to the substrates 21 and 22. Thus, an increase in the wiring space due to the redundant configuration can be avoided.

The terminals 755 to 758, 765 to 768 and 717 are arranged perpendicular relative to the substrates 21 and 22. Here, "perpendicular" is not necessarily mean that the angle formed between substrate 21 and the substrate 22 is 90 degrees, but tolerating design error or an inclination due to the elastic deformation of the spring terminals 26. The terminals 755 to 758, 765 to 768 and 717 are formed substantially straight to connect the substrates 21 and 22, whereby the terminals can be shortened. Thus, wiring impedance can be reduced.

As described above, the drive apparatus 1 includes the motor 10, a plurality of substrates 21 and 22, and a plurality of connectors 75 and 76.

The motor 10 includes a plurality of winding groups 11 and 12. The substrates 21 and 22 includes switching elements 301 to 306, 401 to 406 serving as a conduction control of the windings 11 and the windings 12, the microprocessors 51 and 52, and the integrated circuits 56 and 57 as control components related to a driving control of the motor 10, the substrates being provided on one side of the motor 10 in the axial direction thereof.

The first connector 75 is provided in the opposite side against the motor 10 across the substrates 21 and 22, including the terminals 755 to 758 connected to the first substrate 21. The second connector 76 is provided in the opposite side against the motor 10 across the substrates 21 and 22, including the terminals 765 to 768 connected to the second substrate 22.

In the first substrate 21, when projecting in the axial direction of the motor 10, two or more (two in the present embodiment) non-overlapped regions RM1 and RM2 are present where the first substrate 21 is not overlapped with the second substrate 22.

The region RT1 as one of the non-overlapped regions is defined as the connector connecting region connected to the connector terminals, i.e., the power terminal 755, the ground terminal 756, and the vehicle signal terminal 758. The region RM1 as one of the non-overlapped regions other than the region RT1 is defined as a motor line connecting region connected to the motor lines 115 corresponding to respective phases in the windings 11.

In the second substrate 22, when projecting in the axial direction of the motor 10, two or more (two in the present embodiment) non-overlapped regions RM2 and RT2 are present where the second substrate 22 is not overlapped with the first substrate 21. The region RT2 as one of the non-overlapped regions is defined as the connector connecting region connected to the connector terminals, i.e., the power terminal 765, the ground terminal 766, and the vehicle signal terminal 768. The region RM2 as one of the non-overlapped regions other than the region RT2 is defined as a motor line connecting region connected to the motor lines 125 corresponding to respective phases in the windings 12.

According to the present embodiment, the terminals 755 to 758 and the motor lines 115 are connected to the first substrate 21 in the non-overlapped region, and the terminals 765 to 769 and the motor lines 125 are connected to the second substrate 22. Thus, the terminals 755 to 758, 765 to 768 and the motor lines 115 and 125 are extended substantially straight to connect with the substrates 21 and 22. Hence, the wiring space can be minimized. Also, since the wiring can be shortened, wiring impedance can be reduced.

A plurality of substrates 21 and 22 have the same shape. Accordingly, compared to the case where substrates having different shapes are used, the number of types of components can be reduced.

According to the present embodiment, two substrates are disposed such that one substrate 21 is rotated by 90 degrees with respect to the other substrate 22. Thus, a space in the motor silhouette can be effectively utilized.

The rotation sensor 60 is mounted on the first substrate 21 disposed in the most motor 10 side. Hence, rotation of the motor 10 can be appropriately detected.

According to the present embodiment, two substrates 21 and 22 are provided, in which the substrate disposed in the most motor 10 side is defined as the first substrate 21, and the substrate disposed in the most connectors 75 and 76 side is defined as the second substrate 22.

The heat sink 80 is provided between the first substrate 21 and the second substrate 22. At least a part of the switching elements 301 to 306 and 401 to 406 are mounted on the first surfaces 211 and 221 as a surface in the heat sink 80 side, being capable of radiating heat to the heat sink 80.

Thus, heat produced by the switching elements 301 to 306 and 401 to 406 can be appropriately radiated to the heat sink 80.

According to the present embodiment, two winding groups 11 and 12 are provided. The first substrate 21 is connected to the motor lines 115 connected to one wiring group 11. The switching elements 301 to 306 related to the conduction control of the windings 11, the first microprocessor 51 and the first integrated circuit 56 are mounted.

The second substrate 22 is connected to the motor lines 125 connected to the other windings 12, including the switching elements 401 to 406 related to the conduction control of the windings 12, the second microprocessor 52 and the second integrated circuit 57 mounted thereon.

According to the present embodiment, components related to the first system 901 are mounted on the first substrates, and components related to the second system 902 are mounted on the second substrate 22, such that the substrates 21 and 22 are provided corresponding to respective systems.

Thus, even if an abnormality occurs on one substrate, a drive control of the motor 10 can be maintained by the other substrate. Moreover, the heat sink 80 is provided between the substrates 21 and 22. In other words, the substrates 21 and 22 are located close to both sides of the heat sink 80. As a result, one system is prevented from being influenced by heat produced in the other system.

In the substrates 21 and 22, the spring terminals 26 are provided. The spring terminals 26 are elastic-deformed when the terminals 755 to 758, 765 to 768 and 717 are inserted thereto so that the spring terminals 26 come into contact with the terminals 755 to 758, 765 to 768 and 717. Accordingly, the terminals are inserted to the respective spring terminals 26, whereby the terminals and the substrates can readily be connected. Also, manufacturing processing such as soldering for electrically connecting the terminals and the substrates can be omitted.

The electric power steering apparatus 108 is provided with the drive apparatus 1 and the reduction gear 109. The reduction gear 109 transmits the power of the motor 10 to the column shaft 102, the motor 10 outputting an auxiliary torque that assists steering of the steering wheel 101 by the driver.

The drive apparatus 1 is applied to the electric power steering apparatus 108, whereby the wiring space can be prevented from increasing in a configuration where a plurality of connectors and substrates are provided. As a result, both of shrinking apparatus and redundant configuration can be accomplished.

Second Embodiment

Figure 7:
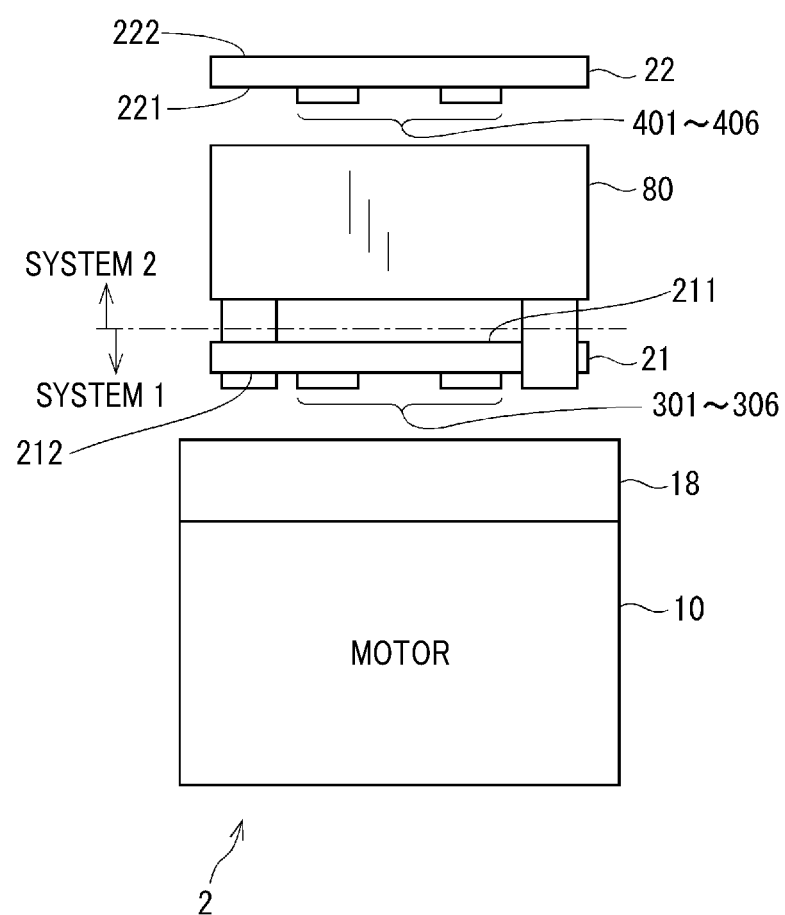
FIG. 7 is a schematic side view illustrating an arrangement of systems of the drive apparatus according to the second embodiment of the present disclosure.

The second embodiment of the present disclosure will be described with reference to FIG. 7. FIG. 7 corresponds to FIG. 5 in the first embodiment.

As shown in FIG. 7, in the drive apparatus 2, components mounted on the first surface 211 of the first substrate 21 in the first embodiment are mounted on the second surface 212, and the components mounted on the second surface 212 in the first embodiment are mounted on the first surface 211. Specifically, the SW elements 301 to 306 are mounted on the second surface 212 of the first substrate 21. The SW elements 301 to 306 are provided to be capable of radiating heat to the frame 18. In other words, in the present embodiment, the frame 18 serves as a heat sink. The frame 18 has a function of providing outer frame of the motor 10 and a function of the heat sink.

In addition to the SW elements 301 to 306, the current detectors 311 to 313 and the first integrated circuit 56 or the like may be provided to be capable of radiating heat to the frame 18. Similar to the first embodiment, the SW elements 401 to 406 mounted on the second substrate are provided to be capable of radiating heat to the heat sink 80.

According to the present embodiment, the substrates 21 and 22 are provided in the both sides of the heat sink 80 in the axial direction. Hence, similar to the first embodiment, in the first and second systems 901 and 902, one system is prevented from being influenced by heat produced in the other system. Moreover, the SW elements 301 to 306 are mounted on the second surface 212 of the first substrate 21, and the SW elements 401 to 406 are mounted on the first surface 221 of the second substrate 22. In other words, both of the SW elements 301 to 306 and the SW elements 401 to 406 are mounted on respective surfaces in the motor 10 side of the substrates 21 and 22. In the substrates 21 and 22, the electronic components which require heat radiation are arranged in the same side, radiating heat towards the same direction. Hence, a common layout can be used for the substrates 21 and 22. Accordingly, the number of types of components can be reduced. The connection between the motor lines 115, 125, the terminals 755 to 758 and 765 to 768, and the substrates 21 and 22 is the same as those of the above-described embodiments.

In the drive apparatus 2, the SW elements 301 to 306 mounted on the first substrate 21 are arranged to be capable of radiating heat towards the frame 18 which forms an outline of the motor 10 in the one side relative to the axial direction thereof. The SW elements 401 to 406 mounted on the second substrate 22 are arranged to be capable of radiating heat to the heat sink 80.

Thus, common layout can be used for the substrates 21 and 22 so that the number of types of components can be reduced. Further, similar effects to the above-described embodiments can be obtained.

Third Embodiment

Figure 8:
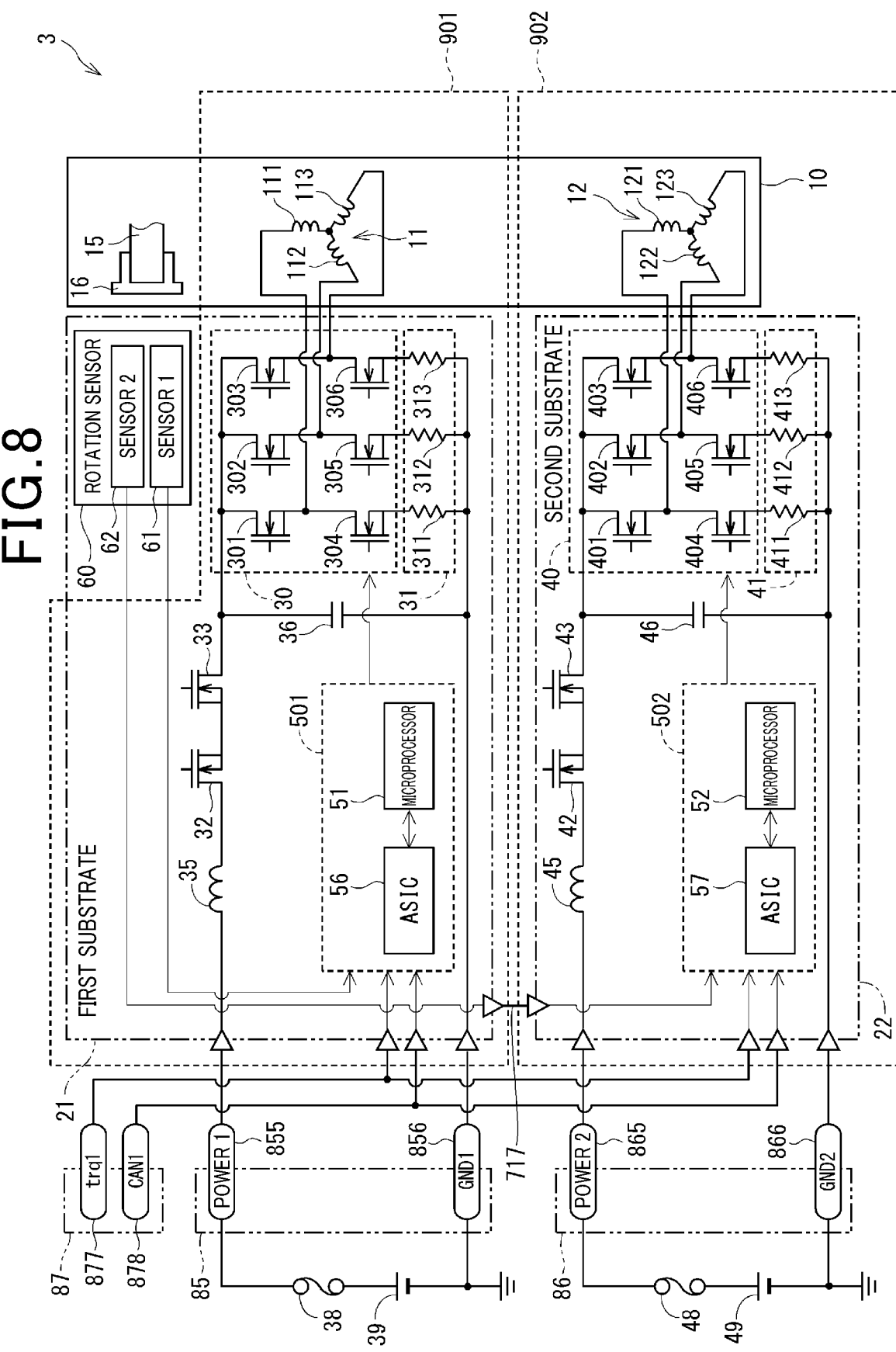
FIG. 8 is a circuit diagram showing a drive apparatus according to the second embodiment of the present disclosure.

With reference to FIG. 8, the third embodiment of the present disclosure will be described.

According to the above-described embodiments, the power supply portion, the sensor connecting portion and the CAN connecting portion are integrated. In the drive apparatus 3 according to the present embodiment, the power supply connectors 85 and 86, and the signal connector 87 are provided separately.

The first power supply connector 85 includes a power terminal 855 and a ground terminal 856 formed thereon. Similar to the first embodiment, the power terminal 855 and the ground terminal 856 are connected to the first substrate 21 in the non-overlapped region RT1.

The second power supply connector 86 includes a power terminal 865 and a ground terminal 866 formed thereon. Similar to the first embodiment, the power terminal 865 and the ground terminal 866 are connected to the second substrate 22 in the non-overlapped region RT2.

According to the present embodiment, the power supply connectors 85 and 85 correspond to "connector" and the terminals 855, 856, 865 and 866 correspond to "connector terminals".

The drive apparatus 3 is provided with a single signal connector 87. The signal connector 87 is provided with a torque signal terminal 877 and a vehicle signal terminal 878. The torque signal terminal 877 and the vehicle signal terminal 878 are connected to the first substrate 21 and the second substrate 22. Similar to the internal signal terminal 717, the torque signal terminal 877 and the vehicle signal terminal 878 penetrate the substrates 21 and 22 in the overlapped region where the first substrate 21 and the second substrate 22 are overlapped when viewed from the axial direction, and are inserted into the spring terminals 26, whereby the torque signal terminal 877 and the vehicle signal terminal 878 are connected to the substrates 21 and 22.

Single torque signal terminal 877 is connected to the substrates 21 and 22 so that the same signal can be transmitted to the substrates 21 and 22. For the vehicle signal terminal 878, the same connection as the torque signal terminal 877 is applied.

The mounting portions for the electronic components on the substrates 21 and 22 may be the same as the first embodiment or the second embodiment. The third embodiment is thus configured and obtains the same effects as the above-described embodiments.

Fourth Embodiment

Figure 9:
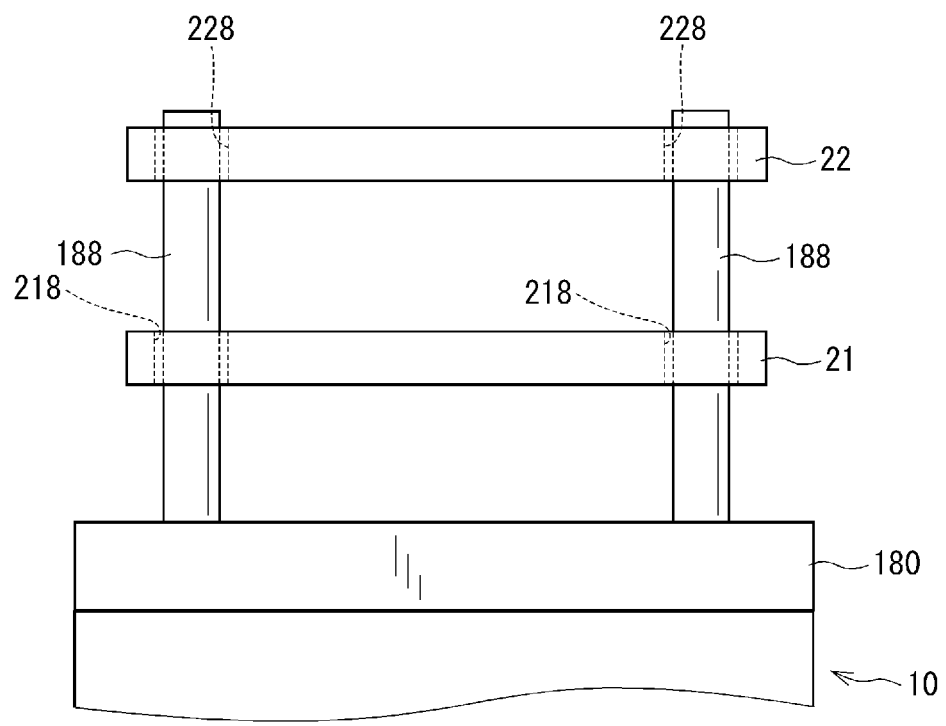
FIG. 9 is a schematic diagram showing a positional alignment of the substrate according to the third embodiment.

According to the fourth embodiment and the fifth embodiment, configurations of a positional alignment of the substrates 21 and 22 will mainly be described. The configurations of the positional alignment in the fourth and fifth embodiments may be combined with any one of the above-described embodiments. FIGS. 9 and 10 according to the fourth and fifth embodiments are schematic side views, in which the spring terminals, electronic components mounted on the substrates 21 and 22 are omitted.

The fourth embodiment according to the present disclosure is illustrated in FIG. 9. In the fourth embodiment, heat sink is omitted and the substrates 21 and 22 are fixed to the frame 180.

As shown in FIG. 9, in the frame 180, a boss portion 188 for the positional alignment is formed other than an unshown substrate fixing portion that fixes the substrates 21 and 22. The boss portion 188 protrudes towards the controller 20 side, and formed in a column shape.

In the first substrate 21, a positional alignment hole 218 is provided to which the boss portion 188 is inserted. In the second substrate 22, a positional alignment hole 228 is provided to which the boss portion 188 is inserted. The boss portions 188 are inserted to respective positional alignment holes 218 and 228, whereby the substrates 21 and 22 are positionally aligned. Thus, the terminals can be appropriately inserted into the respective spring terminals 26. The position of the substrates 21 and 22 in the axial direction can be determined by a substrate fixing portion or the like provided in addition to the boss portion 188. Further, similar effects to the above-described embodiments can be obtained.

Fifth Embodiment

Fifth embodiment of the present disclosure will be described with reference to FIG. 10.

As shown in FIG. 10, in the heat sink 82, a jig insertion hole 829 is provided to which a positional alignment jig is inserted. In the substrates 21 and 22, jig insertion holes 219 and 229 are formed at portions corresponding to the jig insertion hole 829. According to the present embodiment, since the jig insertion holes 219, 229 and 829 are provided in the substrates 21 and 22, and the heat sink 82, by using the positional alignment jig 3 capable of inserting into the jig insertion holes 219, 229 and 829, the substrates 21 and 22 can be positionally aligned. Thus, terminals can be appropriately inserted into the spring terminals 26. Further, similar effects to the above-described embodiments can be obtained.

Other Embodiment (A) The Number of Systems

According to the above-described embodiments, two winding groups are provided, in which SW elements and control components are provided for each winding group. According to other embodiment, the number of winding groups may be three or more. Also, three or more pairs of SW element and control component may be provided.

(B) Substrate and Terminal

According to the above-described embodiments, two substrates are provided. According to other embodiments, three or more substrates may be provided. According to the above-described embodiment, three or more non-overlapped portions for each substrate may be provided. According to the above-described embodiment, one region in the two non-overlapped regions is the connector connecting region and the other region is the motor line connecting region. According to other embodiment, at least one region in the connector connecting region and the motor line connecting region may be provided in plural number. Also, non-overlapped regions which are not the connector connecting region or the motor line connecting region may be provided.

According to the above-described embodiments, two substrates having the same shape are rotated by 90 degrees so as to provide the non-overlapped regions. According to other embodiment, the rotation angle of the substrates may exclude 90 degrees as long as the angle can form the non-overlapped region. Also, the shapes of the plurality of substrates can be different.

According to the above-described embodiments, each terminal and the substrate are electrically connected by inserting the terminal into the spring terminal. Also, according to the above-described embodiments, the spring terminals are provided in a surface of a base portion side of the terminal to be inserted. According to other embodiments, the spring terminals may be provided on either one surface of the substrate, or may be provided on a tip-end surface of the terminal to be inserted in each substrate. Also, according to other embodiments, a connection method of connecting the terminal to the substrate is not limited to a method using the spring terminal, but any other method such as a soldering may be used.

The motor lines and the substrates are electrically connected by a soldering or the like. According to other embodiments, spring terminals may be provided on the substrate for connecting the motor lines, and the substrates and the motor lines may be connected by the spring terminals.

According to the above-described embodiments, the terminals and the substrates are connected to be substantially perpendicular. According to other embodiment, the connection terminal may be obliquely inserted relative to a plurality of substrates. Also, the motor lines and the substrates can be connected similar to the connection terminal.

According to the first embodiment, the power terminal, the ground terminal, the torque signal terminal and the vehicle signal terminal correspond to "connector terminals". According to the third embodiment, the power terminal and the ground terminal correspond to "connector terminals". According to other embodiment, the power terminal, any of the ground terminal, the torque signal terminal and the vehicle signal terminal may be omitted among the connector terminals connected to the substrate in the non-overlapped region, or other terminals may be "connector terminals".

According to the above-described embodiment, the internal signal terminal is used for transmitting the detection value of the rotation sensor. In other embodiment, the internal signal terminal may be used for transmitting information other than detection value of the rotation sensor between substrates.

(C) Control Components

According to the above-described embodiment, for the control components, two packages including a microprocessor and an integrated circuit are provided for every system. In other embodiments, the control components may be configured as single package or three or more packages for every system. Moreover, any of a pre-driver, a signal amplifier, and a regulator included in the integrated circuit may be omitted. At least any of the control components may be shared by a plurality of systems.

(D) Rotation Sensor

According to the first embodiment, the rotation sensor includes two sensors. In other embodiments, the number of sensors included in the rotation sensor may be one or three or more. According to the above-described embodiments, single sensor includes a function of calculating a rotational angle and a function of calculating rotation frequency. In other embodiments, the function of calculating rotation frequency may be omitted.

According to the above-described embodiments, the first controller uses detection values of the first sensor, and the second controller uses detection values of the second sensor. According to other embodiments, detection values of the first and second sensors may be used for the first and second controllers. In other words, the internal signal terminal may be used to transmit the detection value of the first sensor in addition to the detection value of the second sensor of the rotation sensor.

According to the above-described embodiments, two sensors are configured as one package. In other embodiments, a plurality of packages may be used. In the case where two sensors are configured as different packages, one package may be mounted on the motor side surface and other package may be mounted on an opposite surface to the motor 10. In other words, any of packages may be mounted on the opposite surface to the motor.

(E) Connector Unit

According to the above-described embodiments, two or three connectors are provided in the connector unit. In other embodiments, the number of connectors in the connector unit may be four or more. Also, according to the above-described embodiments, the opening portion of the connector is located in opposite side of the motor unit and harness or the like is inserted to the connector in the axial direction. In other embodiments, an opening direction of the connector is not limited to the axial direction, but the opening portion may be located radially outside and a harness or the like may be inserted from radially outside. The number of connectors is not limited.

The connector unit according to the above-described embodiments includes a cover and connectors integrated therein. However, according to other embodiment, the cover and the connector may be configured as different bodies.

According to the above-described embodiments, tip end of the cover in the connector unit is inserted into the groove portion of the motor case, whereby the connector unit is fixed to the motor case. In other embodiments, the connector unit may be fixed to the frame. Moreover, instead of using adhesive, the connector unit may be fixed to the motor case by a screw or the like. The connector unit may be fixed to a frame other than the motor case.

(F) Drive Apparatus

According to the above-described embodiments, the motor is configured as a three-phase brushless motor. According to the other embodiment, the motor is not limited to three-phase brushless motor, but any other type of motors can be used. Also, the motor is not limited to a motor but may be a generator, or a so-called motor-generator having both of motor and generator functions.

In the above-described embodiment, the drive apparatus is applied to an electric power steering apparatus. According to other embodiments, the drive apparatus may be applied to an apparatus other than the electric power steering apparatus.

As described above, the present disclosure is not limited to the above-described embodiments. However, embodiments may be modified in various ways without departing the scope of the present disclosure.

What is claimed is:

1. An electric power steering apparatus comprising:
   a motor;
   a controller integrated with the motor in the electric power steering apparatus and comprising electrical components mounted on a substrate; and
   a connector unit including a cover that comprises a first connector and a second connector, the first and second connectors connecting power and signals to the electric power steering apparatus,
   wherein:
   each of the first connector and the second connector comprises a power supply part and a signal connection part, the power supply part comprises at least a power terminal, and the signal connection part comprises at least a signal terminal;
   each of the power terminal and the signal terminal extend from the substrate in an axial direction of the motor, in which the axial direction is substantially perpendicular to the substrate;
   each of the power terminal and the signal terminal extend through the cover;
   each of the first connector and the second connector are arranged within a silhouette of the motor along the axial direction of the motor;
   each of the first connector and the second connector comprises an opening positioned on a side of the cover opposite the motor in the axial direction of the motor, the first and second connectors being capable of connecting with a harness in the axial direction;
   the first connector and the second connector are arranged in non-parallel on the substrate;
   the first connector and the second connector connect to and disconnect from the harness in a direction substantially parallel to the axial direction of the motor; and
   a portion of each of the power terminal and the signal terminal that extends from the cover toward the substrate in the axial direction has a substantially straight shape.

2. The electric power steering apparatus according to claim 1, wherein
   the signal connection part includes a sensor connector and a communication connector,
   the sensor connector includes at least a torque signal terminal;
   the communication connector includes at least a vehicle signal terminal; and
   the power supply part, the sensor connector and the communication connector are arranged in the order of the power supply part, the sensor connector and the communication connector within each of the first connector and the second connector.

* * * * *